US012476810B2

(12) United States Patent
Veshchikov

(10) Patent No.: US 12,476,810 B2
(45) Date of Patent: Nov. 18, 2025

(54) DIVERSIFICATION OF INSTRUCTION SET ENCODINGS TO PROTECT SOFTWARE

(71) Applicant: NXP B.V., Eindhoven (NL)

(72) Inventor: Nikita Veshchikov, Brussels (BE)

(73) Assignee: NXP B.V., Eindhoven (NL)

( * ) Notice: Subject to any disclaimer, the term of this patent is extended or adjusted under 35 U.S.C. 154(b) by 207 days.

(21) Appl. No.: 18/387,406

(22) Filed: Nov. 6, 2023

(65) Prior Publication Data

US 2025/0150272 A1 May 8, 2025

(51) Int. Cl.
*H04L 9/32* (2006.01)
*G06F 9/30* (2018.01)
*H04L 9/08* (2006.01)
*H04L 9/14* (2006.01)

(52) U.S. Cl.
CPC ............ *H04L 9/32* (2013.01); *G06F 9/30145* (2013.01); *H04L 9/0861* (2013.01); *H04L 9/14* (2013.01)

(58) Field of Classification Search
CPC . H04L 9/32; H04L 9/0861; H04L 9/14; G06F 9/30145; G06F 9/30178
See application file for complete search history.

(56) References Cited

U.S. PATENT DOCUMENTS

| 7,929,692 | B2 | 4/2011 | Kim et al. | |
| 8,566,481 | B2 * | 10/2013 | Ver Steeg | H04L 41/0856 710/13 |
| 9,069,548 | B2 | 6/2015 | Lin et al. | |
| 9,906,360 | B2 * | 2/2018 | Johnson | H04L 9/0631 |
| 11,023,619 | B2 | 6/2021 | Buendgen | |
| 2020/0089916 | A1 | 3/2020 | Buendgen | |
| 2020/0410102 | A1 | 12/2020 | Miller | |
| 2025/0124156 | A1 * | 4/2025 | Beecham | G06F 16/9024 |

FOREIGN PATENT DOCUMENTS

| CN | 110210189 B | 6/2021 |
| EP | 0275170 B1 | 1/1994 |
| EP | 1387250 B1 | 7/2011 |
| EP | 3493092 B1 | 8/2021 |
| WO | 2013135064 A1 | 9/2013 |

* cited by examiner

Primary Examiner — Abiy Getachew

(57) ABSTRACT

Software programs and firmware of an embedded device can be protected against lifting, copying, disassembly, and malware attacks by obfuscating the standard binary encodings of instructions in an instruction set that is understood by the processor(s) of the embedded device. The obfuscation is performed by using a key stored in the embedded device to generate a set of substitute binary encodings for the instructions based on one of a plurality of possible permutations of the standard binary encodings; a binary executable compiled from the software program code is re-encoded using the substitute encodings to produce a substitute "permuted" executable that is stored in memory of the embedded device. A permutation decoding unit in the embedded device obtains the permuted executable from memory, decodes each instruction back into its standard binary encoding using the key, and delivers the standard-encoded instruction to the embedded device's decoder circuit for execution.

19 Claims, 9 Drawing Sheets

DIVERSIFICATION OF INSTRUCTION SET ENCODINGS TO PROTECT SOFTWARE

TECHNICAL FIELD

The embodiments of the present disclosure relate to protecting software installations on embedded devices and, more specifically, to systems and methods for obfuscating instruction set encodings for hardware binding and program extraction defense.

BACKGROUND

In a digital computer system, computing hardware, such as a processor, is designed to execute a finite number of machine instructions that comprise the fundamental operations the processor can perform. A basic instruction set includes instructions for data transfer (e.g., load, store, or move data in hardware registers); arithmetic (e.g., addition, subtraction), logic (e.g., Boolean AND, OR, and NOT), comparison, and test operations (e.g., greater than, less than or equal to); and, control flow within serial and parallel sequences of instruction executions. An instruction set architecture (ISA) includes the basic instructions and, in various instances, advanced instructions and architecture-specific instructions, with instruction formatting that is compatible with particular hardware. The ISA-specific format of an instruction typically includes fields such as the operational code ("opcode"), source and destination registers, immediate values, and memory addresses; many other fields may be encoded by the format, depending on the ISA.

The ISA serves as the bridge between the computing hardware and software programs written by a programmer and executed by the processor. The programmer writes code in a high-level programming language, such as Java, Python, etc., which is then translated into machine code using a compiler or interpreter. This machine code is composed of instructions from the processor's ISA. In various systems, the translated machine code is in the form of a binary executable that can be executed by the processor, allowing the software program to perform its intended functions on the underlying hardware. The binary executable is based on a binary encoding of the instructions and instruction formats used by the ISA.

The encoding device, such as a compiler or interpreter, stores and references an encoding scheme for encoding the instructions and associated data values into their corresponding binary representation. In turn, the computing hardware (e.g., processor) includes a decoding circuit that stores and/or references the encoding scheme in order to interpret the binary data of the binary executable; the decoding circuit decodes each instruction and generates associated control signals to configure the processor, after which the instruction is executed.

An embedded device or embedded system is a particular type of digital computer system that operates in a "closed" environment, such as within a housing or on a single circuit board, using a combination of hardware and software tailored to perform dedicated functions. There are many examples of embedded devices in various fields of application, including automotive systems (e.g., engine control units, airbag systems, vehicle radar and navigation), consumer electronics, medical devices, industrial control systems, and telecommunications. Hardware, software, and ISAs all exist for implementation specifically in connection with embedded devices; typically simplified for such dedicated applications, the fundamental operation of each of these is as described above.

Due to a typical embedded device's simplified programming and architecture, the binary encoding of the instruction set can be susceptible to reverse engineering. Consequently, attacks against embedded devices often involve attempting to steal or modify the binary executable. An attacker may try to extract the code from the device as a first step and then disassemble (and maybe decompile) the code from the binary and/or try to run it in a virtual environment, such as a simulator or a virtual machine. This can help the attacker understand how the device or application works, and thus find vulnerabilities in it. In another scenario, a piece of code might only be authorized to run on one specific device only and cannot be copied or transferred on similar or even identical devices. There must be a binding between the code and the hardware to prevent transfer of the code from one device to another, or else an attacker can lift (i.e., extract) the code from one device, load it into an unauthorized device, and run it there.

It would be advantageous to develop software encoding solutions for embedded devices and embedded systems that serve to insulate the binary encoding of the instruction set from malicious extraction and reverse engineering. More advantageously, such solutions would address the above vulnerabilities of specific embedded devices and hardware bindings of programs, while also obfuscating underlying standardized code sets that are used in diverse device offerings across many fields of application.

SUMMARY

This disclosure provides systems and methods for protecting program code against the unauthorized disassembly, decompilation, and reverse engineering of binary encoded instruction sets in executable binary representations of software programs for embedded devices. Specifically, the systems and methods include using one or more secret permutations of instruction encodings to compile the software program; only an embedded device that also stores the secret permutation can decode the binary executable into the correct corresponding sequences of instructions. The secret permutation serves as an effective hardware binding for a discrete piece of code, and facilitates code diversification that obfuscates instruction set encodings, so a single compromised encoding does not expose all embedded devices that use the underlying instruction set. Thus, the present systems and methods protect program code from attacks in situ on a discrete embedded device, while also hindering attempts to successfully execute the program code, should it be extracted from the authorized embedded device, on unauthorized devices or in simulators.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
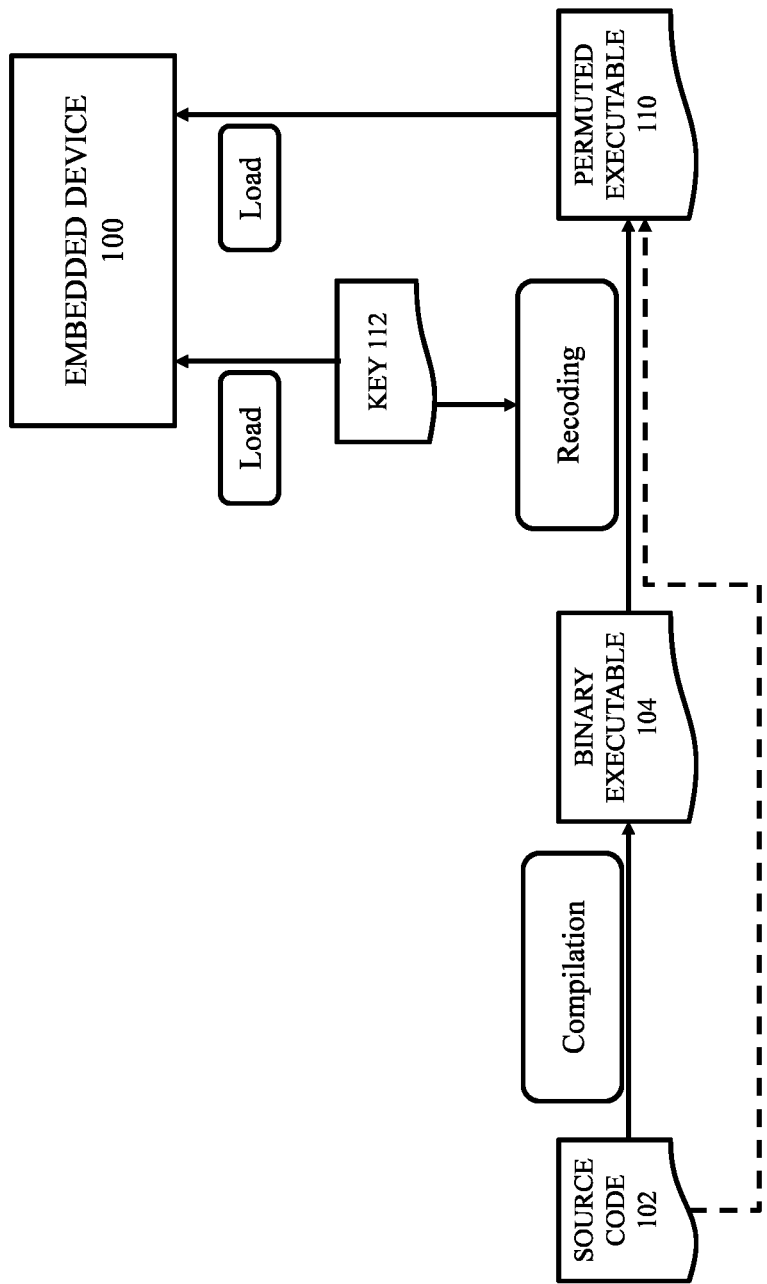
FIG. 1 is a block diagram depicting functional components and data flow for loading an embedded device with a binary executable having a secret encoding in accordance with this disclosure.

It will be readily understood that the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

Embodiments of this disclosure may present in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

For simplicity, the described features, advantages, and characteristics of the invention are described throughout this specification may be described as being implemented within an embedded device including one or more microprocessors, other processing units, programmable and/or non-programmable memory, and other integrated circuits as well as individual circuit components and other pieces of electronic equipment, but the present devices and methods may be implemented in other digital computing systems and devices for which obfuscation and/or diversification of instruction set encodings as described would be useful.

In general, the embodiments described herein provide for protection of software encoded as a binary executable from disassembly/decompilation by deploying a secret permutation of instruction binary encodings to both the software compiler/interpreter and the decoding unit of an embedded device. The systems and methods disclosed herein resolve drawbacks in existing software encoding techniques that use a predetermined binary encoding of the embedded device's instruction set to translate a high-level software program into a binary executable. In particular, by obfuscating the instruction set encoding as described herein, the resulting binary executable is more resistant to code extraction, disassembly, and reverse-engineering attacks that can be performed against embedded devices using known software analysis tools. Moreover, embodiments described herein help to prevent spread of malware by providing embedded devices with code diversification, making it more difficult to write exploits that work on many devices since each malicious payload that contains code would have to be different for each discrete device.

Embodiments of the present systems and methods can be implemented within any presently known or subsequently developed ISA, including without limitation Intel, ARM, and RISC-V. To simplify the explanations within this specification for clarity, the description uses an example architecture and instruction set with only 4 instructions—load, store, add and multiply—that can be binary encoded using two bits. It will be understood that in practice an ISA may implement many more instructions, and that instructions (and thus their encodings) often specify which registers are to be used and where the result(s) of the operation should be stored; the principles described in this document will apply to such instruction sets by correspondingly increasing the code size, i.e., to three, four, or eight bits, or more, as needed to encode all instructions and their payloads.

FIG. 1 illustrates an example process for loading a binary executable of a software program, encoded in accordance with the present disclosure, onto a device 100, such as a suitable embedded device. The instructions in the ISA of the device 100 may have a "standard" or default encoding, an example of which is shown in the following table:

TABLE 1

| Instruction | Encoding |
|---|---|
| Load | 00 |
| Store | 01 |
| Add | 10 |
| Multiply | 11 |

A compilation of the source code 102 of the software program, using the above standard encoding, produces a binary executable 104. This binary executable 104 typically would be directly loaded into memory of the device 100. In various embodiments of the systems and methods of the present disclosure, the binary executable 104 undergoes a recoding process to produce a permuted executable 110 that remains in binary form, but has been recoded using a secret permutation of binary encodings of the instruction set, as described further below. Alternatively, rather than recoding the binary executable 104, the initial compilation of the source code 102 may be done using the secret permutation of the binary encodings to produce the permuted executable 110, skipping the standard encoding altogether. This is shown in FIG. 1 by the dashed arrow.

The permuted executable 110 is loaded into the device 100 memory for execution. The device 100 may be configured to decode the permuted executable 110 and execute the program instructions. In some embodiments, the secret permutation of the binary encodings may be generated based on a key 112, such as a seed value used to randomize or otherwise produce the secret permutation of the encodings. The key 112 may be loaded into the device 100 memory and used by the device 100 to locally (i.e., in the device 100 memory or otherwise on the device 100 hardware) reconstruct the secret permutation of binary encodings, which is then used to decode the permuted executable 110 into the correct instructions as given by the original source code 102. Once the key 112 is loaded in the device 100 it can be locked and read-protected so that only the particular device 100 itself can access the key 112 for the decoding.

Figure 2:
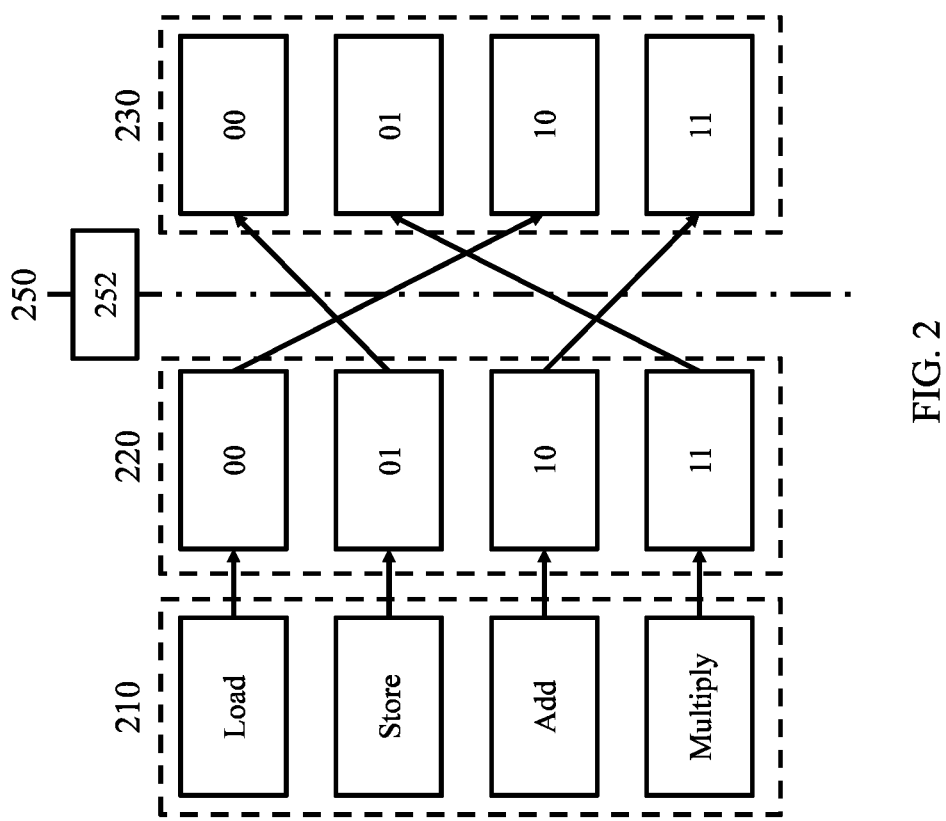
FIG. 2 is a block diagram depicting an example instruction set encoding in accordance with this disclosure.

FIG. 2 illustrates an example mapping 200 of the instruction set 210 from the instructions' standard encodings 220 to their permuted encodings 230 based on a permutation algorithm 250 that receives a key 252 (e.g., a seed value) as input and produces a corresponding secret permutation of instruction encodings as output. In some embodiments, as illustrated, the permutation algorithm 250 also receives the standard encodings 220 as input and effectively "shuffles" (i.e., rearranges) the standard encodings 220 based on the key 252 to produce the permuted encodings 230. Consequently, if the standard encodings 220 for the instruction set 210 are known to an attacker (and, thus, the attacker could successfully decode the binary executable 104 of FIG. 1), the attacker's attempt to decode a recoded executable (e.g., the permuted executable 110 of FIG. 1) would result in a nonsense sequence of instructions. Take, for example, a program that loads two values, adds them together and stores a result. Using the standard encodings 220, this program would be encoded as follows in the executable binary: 00 00 10 01. According to the example permuted encodings, the same program would be encoded in the permuted executable as: 10 10 11 00. If an attacker extracts the permuted executable from the device and tries to disassemble it using standard tools, instead of "Load, Load, Add, Store" the decoded result would be "Add, Add, Multiply, Load," which is a completely different, and nonsensical, program. This way, even if the attacker is able to extract the code from the device, it might take him a lot of time to understand that the code that was extracted is not the code that is executed because the code will still have no issues during the disassembly and possibly even decompilation.

A permutation based on a key (i.e., a secret seed value) may be generated in many different ways. For example, the permutation algorithm 250 may include control logic that, when executed by an encoder, performs a bijection of the standard encodings 220 to obtain a set of possible permutations of the standard encodings 220; then the key 252 is used to select one of the permutations to use for the permuted encodings 230. In some embodiments, generating a permutation can be akin to performing an encryption, such as a block cypher, of the standard binary encodings 220, or of the instruction set itself, or of the binary executable itself.

However, other embodiments of the present permutation methods may provide advantages over standard encryptions such as block cyphers. For example, in standard encryption, several instructions may be encrypted in one block and thus to read one instruction the processor needs to decrypt an entire block; in the present methods however, the permutations may be done instruction by instruction and do not have to use block cyphers or other strong encryption, and therefore can be much faster in terms of execution (of the permutation decoding) compared to traditional encryption. Additionally, when encryption is performed on a per-instruction basis, there may be encoding outcomes where the result of an encryption does not correspond to the standard encoding of another existing legitimate instruction—it can be a forbidden or invalid code that does not correspond to any instruction and therefore does not "dupe" an attacker like the present methods (it should be noted that fidelity of an encryption schema to the standard instruction encodings can be improved using a suitable format-preserving encryption (FPE) algorithm).

In various embodiments that demonstrate these advantages, the permutation algorithm 250 may include control logic for using the key 252 to select a specific set of permuted encodings 230 from a table of all possible secret permutations of the standard encodings 220. In some embodiments, the number P of secret permutations in such a table may be determined by the total number N of instructions that are encoded using a given word size (N=4 in the illustrated example). A table that includes all possible permutations except the one that matches the original instruction encodings would have P=N!-1 possible secret permutations (e.g., 4!-1=23 possible secret permutations of the four encodings in the instruction set 210, excluding the possible permutation that matches the original encodings 220). In another example, the table of secret permutations comprises only those permutations that are complete derangements of the standard encodings, i.e., all of the permuted encodings are valid standard encodings, but none match their corresponding standard encoding; this provides P=!N=N!(1−1/(1!)+1/(2!)−1/(3!)+ . . . + (−1^N)/(N!)) possible secret permutations in the table (e.g., !4=4!(1−1/(1!)+1/(2!)−1/(3!)+1/(4!))=9 possible secret permutations selectable by the permutation algorithm 250 of FIG. 2). A permutation encoding unit as described herein may use the key to select a corresponding secret permutation from the table. For example, the key for selecting one of nine possible secret permutations may be a three-bit data element whose value determines which row of the table is selected. The encoding then proceeds as described below with respect to FIG. 3.

It will be understood that the present systems and methods can be implemented for existing and subsequently developed ISAs and their instruction sets, which are much larger and more complicated than the simplified instruction set of the above-described and illustrated examples. For example, the present systems and methods can be implemented for both the ARMv1 instruction set, which includes 26 basic instructions, and the ARMv8 instruction set, which includes hundreds of instructions in both 32-bit and 64-bit execution states. It is further contemplated that the present systems and methods can be implemented for ISAs with extendable and customizable instruction sets; embodiments of the present methods may include obtaining the standard binary encodings for such instruction sets in order to generate secret permutations thereof. In another example, some processors utilize ISAs in which various subsets of instructions are encoded into different word sizes. For example, in an instruction set for 32-bit ARM processors, most instructions are 32 bits long; but, the ISA also includes a subset of instructions that are 16 bits in length, to enable relatively faster access and execution speeds. Some embodiments of the present systems may address such architectures by generating separate permutations each corresponding to a different subset of instructions of the same size. Thus, if a processor has two-, three-, and four-byte instruction encodings, there will be three permutations, each for a corresponding instruction size; in some embodiments, the three permutations may all be generated or selected using the same key/secret value.

In another example, some ISAs include instructions that require auxiliary information or parameters (i.e., data) that is present or is referenced directly in the code alongside with the instructions. For example, the data can be a value or an address for data that a 'Load' instruction has to load into a given register. In one embodiment of the present systems, the permutation encoding and decoding schema may include a first secret permutation for the subset of instructions that do not require a parameter, and a second secret permutation for the subset of instructions that do require a parameter. In some implementations, the word length of the instructions in both subsets is the same (e.g., 32 bits); however, in the first subset, the instruction itself comprises all 32 bits of the word, and in the second subset, the instruction may comprise only the first eight or first 16 bits, and the remainder of the word is the parameter data. The second secret permutation may account for this, and may "shuffle" only the bits that define the instruction, leaving the parameter bits unchanged. Correspondingly, the permutation encoding and decoding operations do not modify the parameter data. In another embodiment, all encodings may be based on the same secret permutation and if an instruction requires a parameter, the device's decoder will discover it after the instruction decoding; effectively, in this embodiment, the permutation encoding and decoding operations transpose only the binary words that represent the instructions themselves, and the data representing parameters, references, etc., is stored and ultimately passed to the decoder unchanged.

Figure 3:
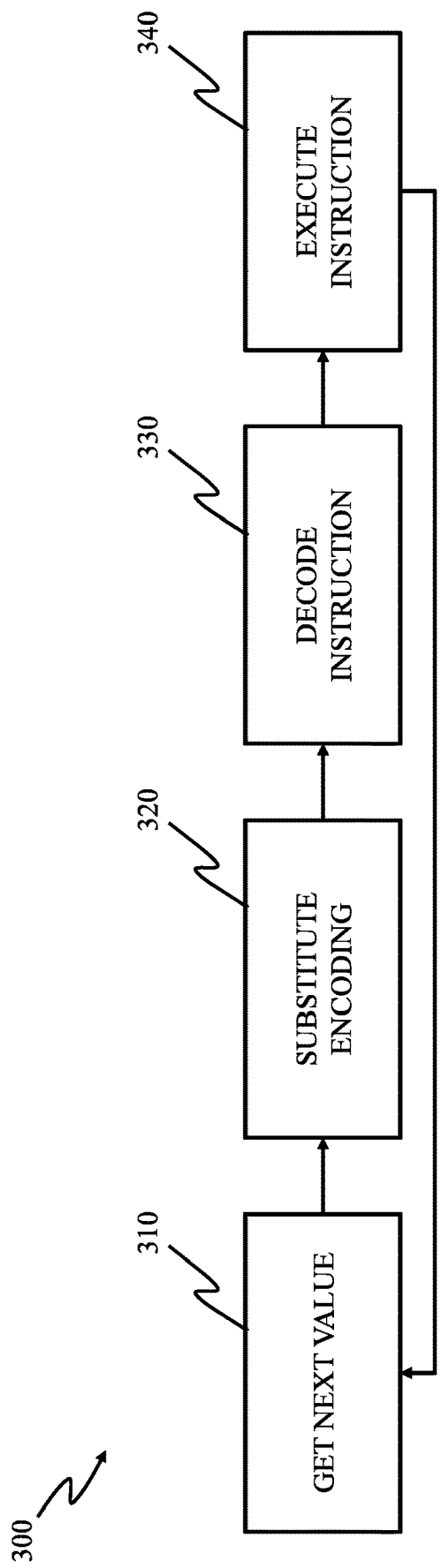
FIG. 3 is a flowchart depicting an example method for decoding binary encoded instructions in accordance with this disclosure.

Referring to FIG. 3, an embedded device, such as the device 100 of FIG. 1, that has the key for the permuted encodings may execute an example method 300 of correctly decoding and executing the software program. In various embodiments, the method 300 may be performed by one or a plurality of microprocessors and/or sub-processing units of an embedded device. The method 300 may be executed during runtime of the permuted executable, or in advance of the program being executed, in accordance with various embodiments described herein. Whether the program is being executed or merely decoded, the device maintains a program counter to keep track of the current position within the program. At 310, the device obtains from the permuted executable the value of the next instruction to be executed (i.e., the value at the location addressed by the program counter). The step 310 may include incrementing the program counter from the previously decoded and executed instruction before getting the next value to be decoded.

At 320, the device may perform a substitution of the encoding, using the key to effectively reverse the "shuffling" of the true binary codes for the instruction set. Thus, with reference to FIG. 2 for example, the device uses the key 252 (e.g., a secret value) to translate the binary value read in step 310 (e.g., "10") from the matching one of the new encodings 230 back to the corresponding one of the standard encodings 220 (e.g., "00"). At 330, the device then uses the matching standard encoding to correctly decode the instruction (e.g., "Load") encoded at the present program counter location. At 340, the device executes the decoded instruction; alternatively the device may configure components of the device hardware for execution of the instruction, or may add the decoded instruction to an execution stack if the program is being decoded pre-execution. The device then returns to 310 to obtain and decode the next instruction; this method 300 may continue to loop until the program is fully decoded or executed.

Embodiments of the present disclosure provide improvements in software program security that also perform advantageously with respect to several important factors in embedded device architecture and design: restrictions on physical space; restrictions on available computing resources; and, repeatability for mass production. With a randomized or otherwise device-specific key, embodiments of the present disclosure can provide a different encoding of instructions for each individual device. This is presently not something that developers of embedded devices and corresponding ISAs and software can achieve in practice, since it may require a different hardware layout, a different design of the instruction decoder, and/or a different compiler for each individualized device. Moreover, most embedded device manufacturers buy CPU core designs from third party manufacturers and do not want to (or sometimes cannot, due to license agreements) change the design of the CPU core, which typically includes the instruction decoder circuit that translates binary code back into executable instructions; changing the instruction decoder itself within each discrete device is not feasible.

Figure 4A:
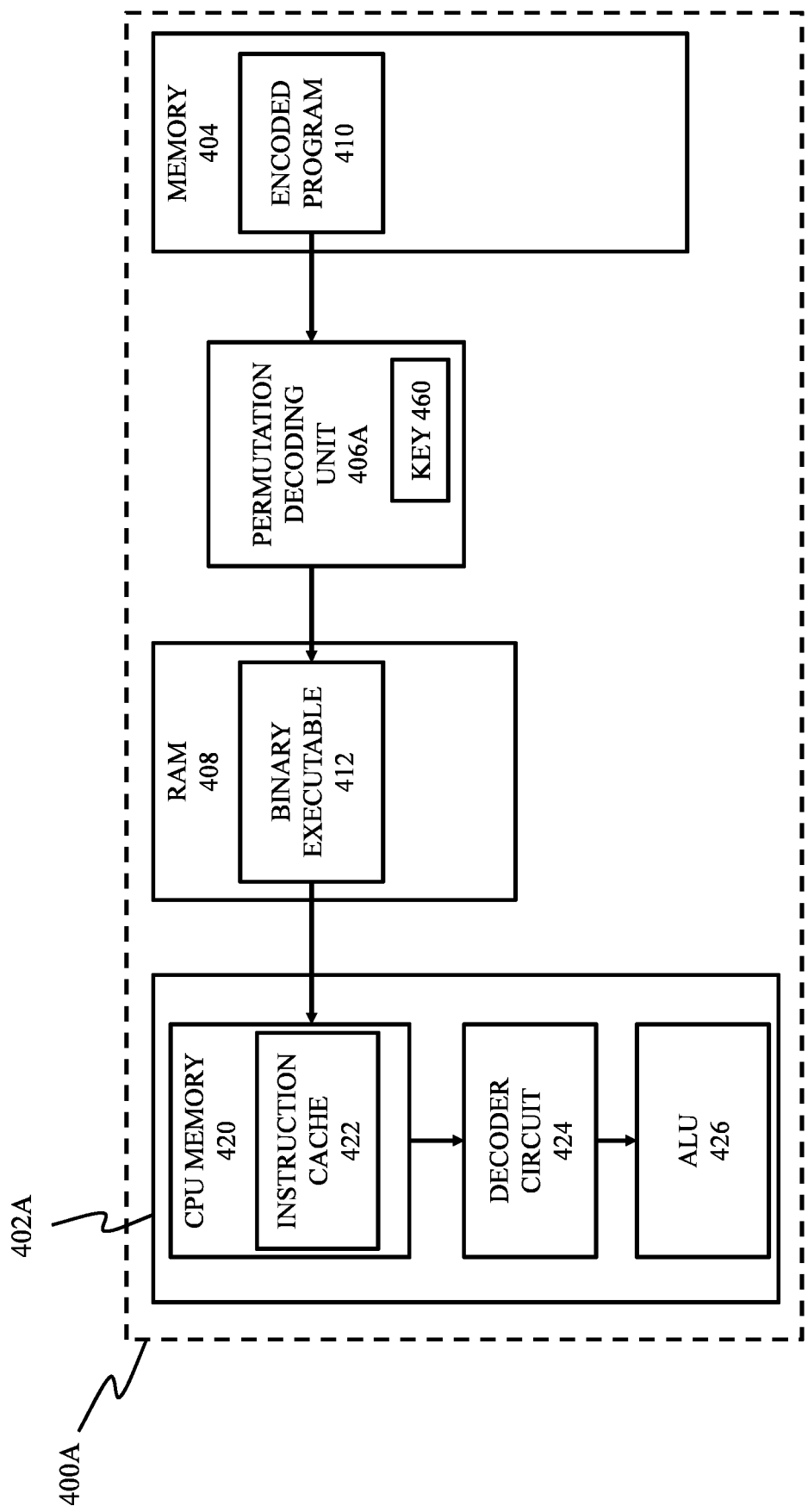
FIGS. 4A, 4B, and 4C are block diagrams each depicting example hardware implementations of an embedded device in accordance with this disclosure.
Figure 4B:
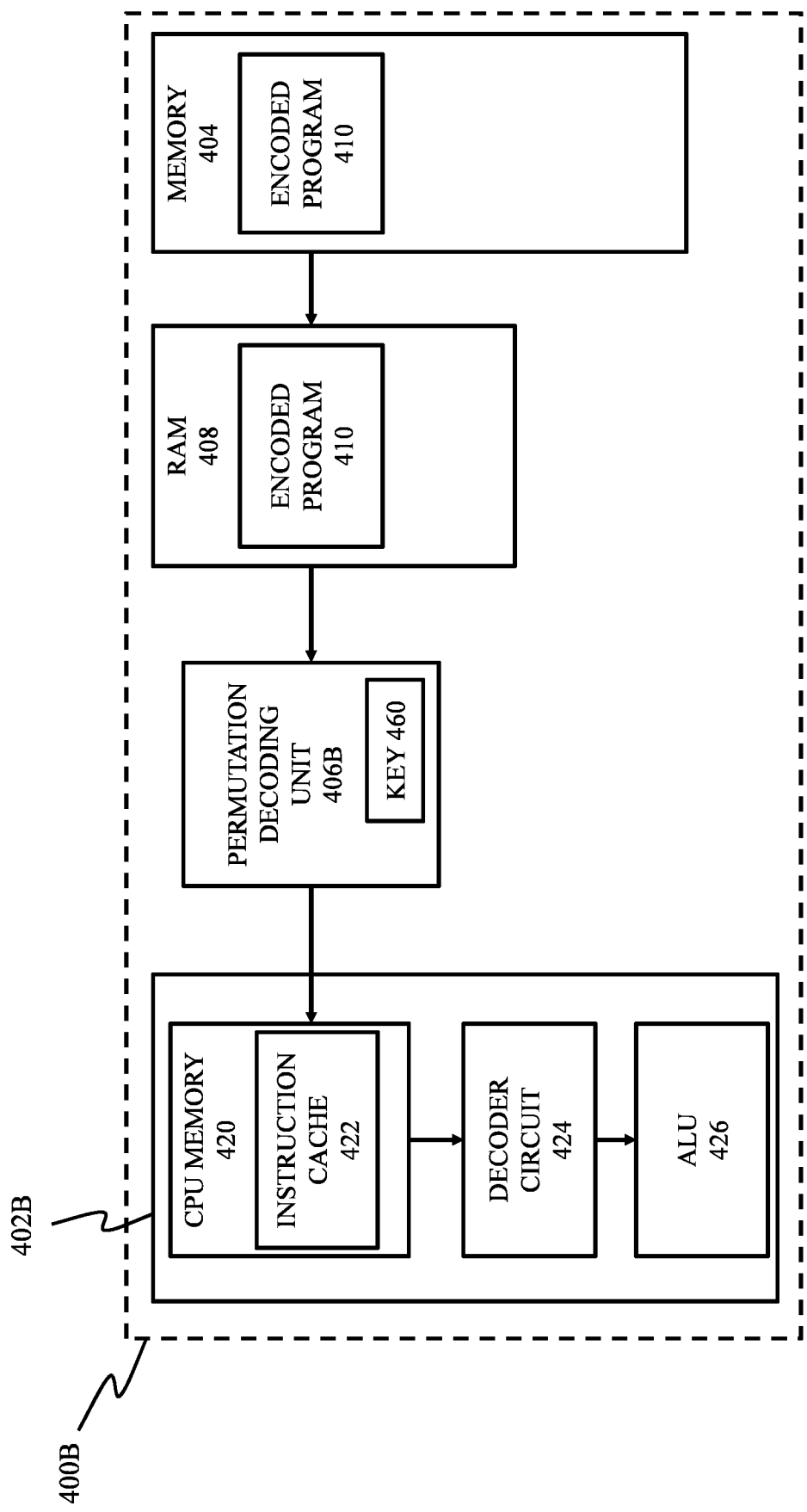
Figure 4C:
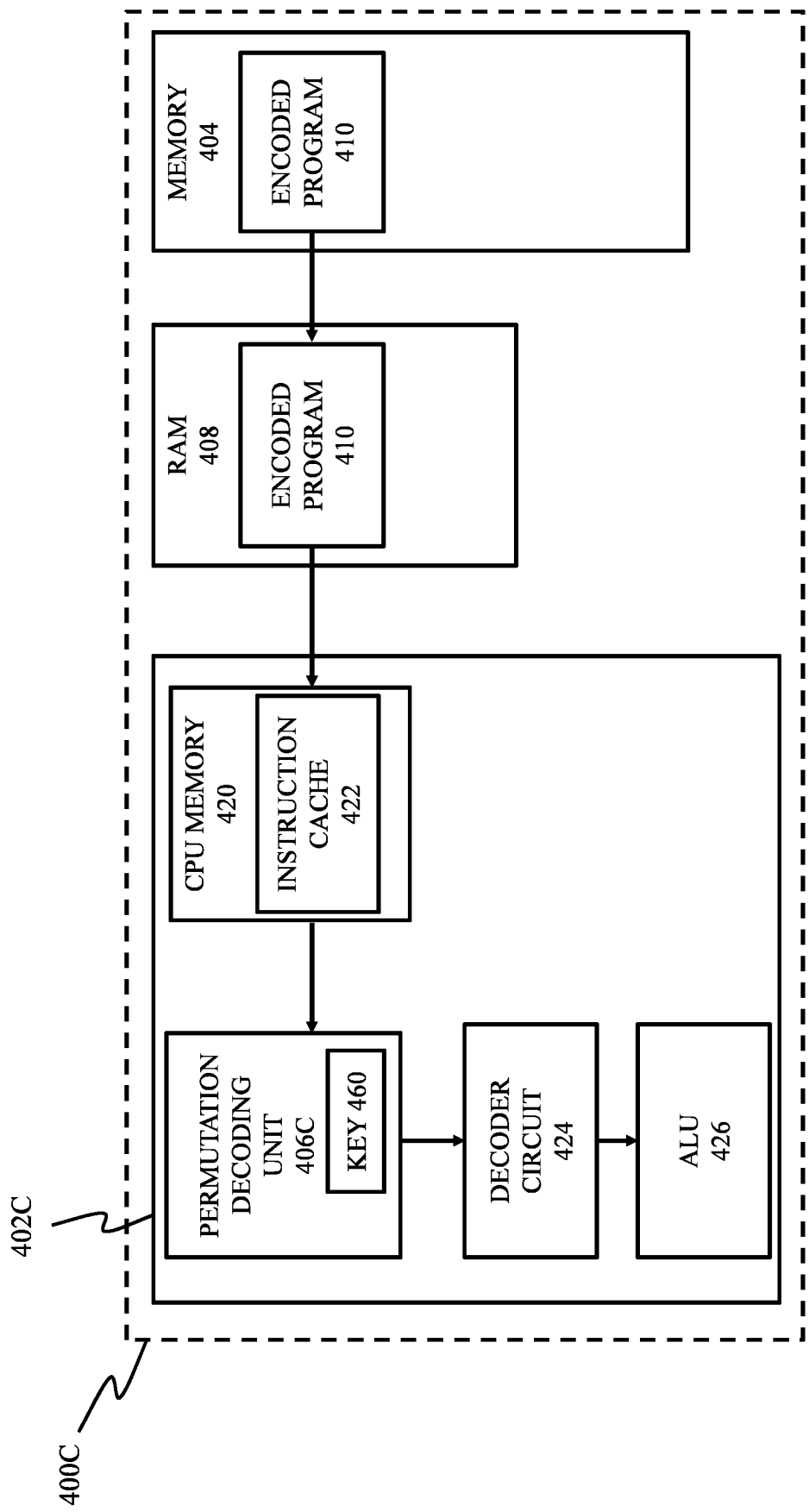

Various embodiments of a solution for device architecture are provided with reference to FIGS. 4A-C, in which an example embedded device 400A, 400B, 400C for executing a program that is compiled into a binary executable and recoded using a secret permutation of the instruction encodings, as described herein, is enabled by the addition of a permutation decoding unit to the embedded device 400A-C. Referring to FIG. 4A, the embedded device 400A may include a processing section 402A including one or more processors. For example, the processing section 402A may comprise a single- or multi-core central processing unit (CPU), or the processing section 402A may comprise several special-purpose processing units that cooperate to execute software programs on the hardware of the embedded device 400A. In some embodiments, the processing section 402A may incorporate a standard CPU core design suitable for embedded devices. For example, the processing section 402A may include: CPU or other on-chip memory 420 that provides fast access to stored data by processors of the device 400A; an instruction cache 422 residing in the CPU memory 420 for storing frequently accessed instructions of a software program being executed by processor(s) of the processing section 402, so the frequently accessed instructions can be quickly executed; a decoding circuit, or decoder 424, that "decodes" a stored software program for execution by reading binary codes from the program's binary executable and translating them into their corresponding instructions using a standard binary encoding of the instruction set within the ISA of the CPU; and, one or more specialized processors such as an arithmetic logic unit (ALU) 426 that receive control signals from the decoder 424 for executing the decoded instructions.

The embedded device 400A may further include memory 404 comprising a plurality of programmable memory modules having any memory access and storage architecture that is suitable for embedded devices. The memory 404 may be non-volatile memory storing an encoded program 410, which may for example be the permuted executable 110 of FIG. 1, that is recoded, using a secret permutation of the instruction set's binary encodings, from a binary executable of a software program in advance of being loaded into the memory 404. The embedded device 400A may further include additional memory modules of varying architectures and storage capacity, arranged in decreasing distances from the processing section 402A to reduce latency. For example, a random access memory (RAM) array 408 may comprise volatile memory and may be disposed between the non-volatile memory 404 and the processing section 402A; software programs may be loaded from the non-volatile 404 into the RAM 408 before execution, to increase execution speed.

In some embodiments, a permutation decoding unit 406A may be configured to perform the example method 300 of FIG. 3. Thus, the permutation decoding unit 406A may read the encoded program 410 from memory 404 value-by-value or in its entirety, in accordance with various embodiments. The permutation decoding unit 406A may be a microprocessor or an integrated circuit with memory to store a permutation key 460 used to decode values within the encoded program 410 into their standard encodings, as described above. The permutation key 460 may be loaded into the permutation decoding unit 406A before, simultaneously with, or after the loading of the encoded program 410 into memory 404. In some embodiments, the permutation decoding unit 406A may operate in an "always on" mode, in which a software program being executed must always be transmitted through the permutation decoding unit 406A; consequently, only software programs that have been stored using the special encoding will be executed correctly on the device 400A because each instruction to be executed first goes through the permutation decoding unit 406A every single time before the execution and will not be correctly decoded unless the instruction was encoded using the key 460.

In some embodiments, such as in FIG. 4A, the permutation decoding unit 406A may be disposed in the signal path between non-volatile memory 404 and RAM 408. When the software program represented by the encoded program 410 is called for execution, the permutation decoding unit 406A may decode the encoded program 410 using the key 460, effectively reversing the secret permutation of the instruction encodings, to produce the binary executable 412 as it was originally compiled. The binary executable 412 may be loaded into RAM 408, and then executed by standard operation of the processor section 402A—that is, the decoder 424 uses the ISA's standard encodings to correctly decode and execute the instructions of the software program.

The architecture of this example embedded device 400A protects against extraction attacks that target the program stored in non-volatile memory 404; also, this architecture can provide better execution speed, relative to other example embodiments described herein, because the original binary executable 412 can be quickly read from RAM 408 using standard operations of the processing section 402A. However, one disadvantage of this embodiment relative to others described below is that the original encoding can be obtained, copied, etc., in an attack on RAM. FIG. 4B provides an alternative architecture for an embedded device 400B, in which components with like reference numerals to FIG. 4A operate as described above. In this embodiment, a permutation decoding unit 406B is disposed between RAM 408 and the processing section 402B (using standard processing as does processing section 402A of FIG. 4A). When the software program is called for execution, the encoded program 410 is loaded from non-volatile memory 404 to RAM 408 without being decoded; consequently, the software program is protected from RAM attacks in this embodiment. The permutation decoding unit 406B uses the permutation key 460 to reverse the secret permutation encoding of the instructions as each code is called into CPU memory 420 or into the decoder 424. This embodiment has the advantage that the processing section 402B is not modified (e.g., there are no modifications to the CPU cores or architecture), and also that the software program remains encoded in all forms of memory outside of the processing section 402B.

However, to maximize the effectiveness of the secret permutation scheme, it would be advantageous for the instructions to remain encoded at every memory location where they are stored, including in the instruction cache 422 and other caches within CPU memory 420. FIG. 4C thus provides an example embedded device 400C in which the processing section 402C itself includes a permutation decoding unit 406C, disposed directly adjacent to the decoder 424 between the CPU memory 420 and the decoder 424. In this embodiment, even program code (i.e., encoded instructions) stored in the instruction cache 422 is encoded using the secret permutation. Thus, when the decoder 424 makes program calls, the next line of code is received (from the instruction cache 422, another cache (not shown), or RAM 408) by the permutation decoding unit 406C, decoded there using the permutation key 460, and the original binary encoded instruction is delivered to the decoder 424. While embodiments such as the embedded device 400C of FIG. 4C may require modifications to a CPU core or cores, or to other processing devices of the processing section 402C, it may in some cases be an advantageous tradeoff in order to eliminate loading into any memory (i.e., non-volatile, RAM, any level of cache memory, etc.) of code that is not protected using a secret permutation.

In various embodiments described thus far, a key associated with the secret permutation of instruction encodings is loaded into the present embedded device along with the corresponding permuted (i.e., already re-encoded, using the secret permutation) executable of the software program, the key being used by the permutation decoding unit of the embedded device to effectively reverse the secret permutation when the software program is executed. This implies that the original binary executable, or the software program, is encoded externally to the embedded device, and thus at least one external party, such as the program developer, has access to the mechanism for generating the secret permutation, if not to the decoding key itself. This scenario requires a solution for key management and distribution; furthermore, for any updates to the software program, each discrete device (which by such time may be deployed) would need its own version of the software update.

In other embodiments, the key may be generated within the embedded devices, such as upon initialization of the embedded device; the embedded device may be configured to encode a binary executable that is loaded into the device, using the generated key to select and apply a secret permutation of the instruction encodings. That is, the embedded device both encodes and decodes the binary executable internally, storing only the encoded version of the binary executable (i.e., the permuted executable described above) in memory of the device. In this scenario, each device may operate in a "loading" mode in which it receives a standard binary (i.e., not encoded with a secret permutation) executable with an update or a new application. Once the binary executable is loaded into the device it undergoes an encoding procedure during which each instruction is replaced by another one according to the secret permutation identified by the internally-generated key. This allows each of the devices to receive the same binary executable during the loading mode; to avoid the situation when the attacker can find out the binary code, the code can be either always loaded in a safe environment or it can be encrypted during transport. For updates and other post-initialization installations, each new binary executable may be authenticated by the developer; if the authentication passes, the device may switch to the "loading" mode or another special "encoding" mode that enables the device to encode the newly received binary executable and store it as a permuted executable as described above.

Figure 5:
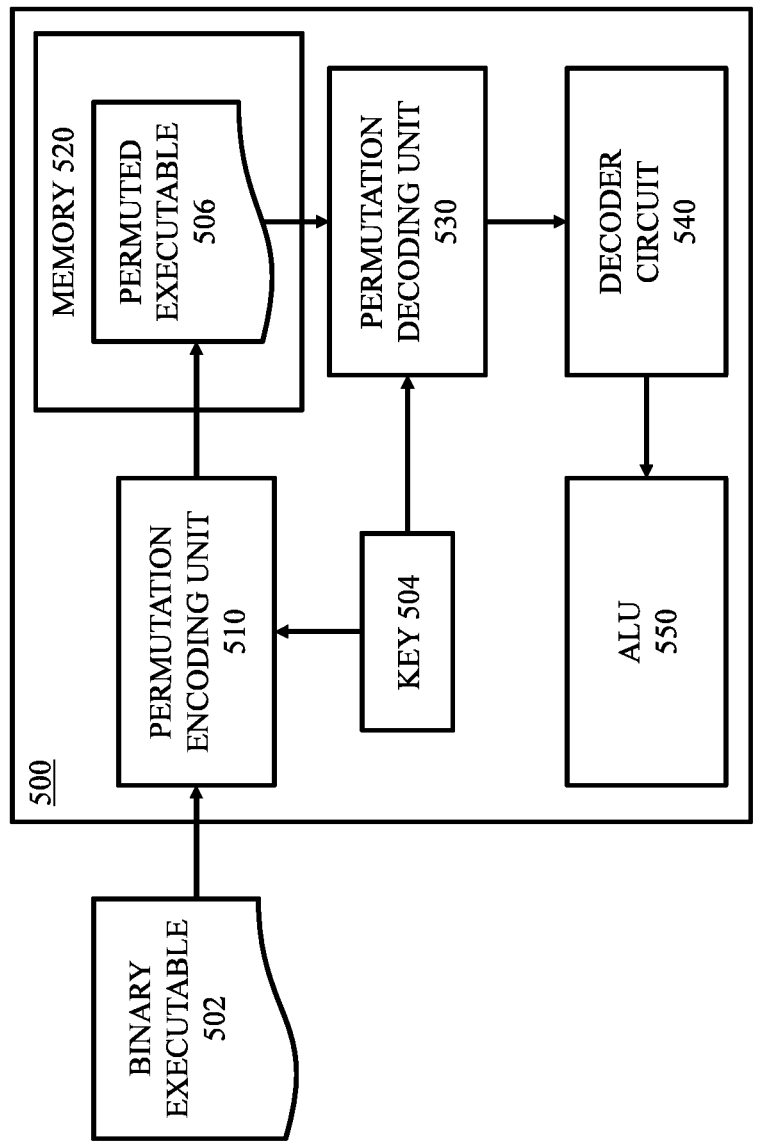
FIG. 5 is a block diagram depicting another example hardware implementation of an embedded device in accordance with this disclosure.

FIG. 5 provides an example embedded device 500 that operates according to these principles to receive a binary executable 502, use an internally generated key 504 to rearrange the standard instruction encodings into a secret permutation thereof, and re-encode the binary executable 502 using the secret permutation to produce and store a permuted executable 506 that correctly represents the originally encoded software program. The embedded device 500 may include a permutation encoding unit 510 that has access to the key 504, to the standard binary encodings of the instruction set, and to memory 520 of the embedded device 500. In some embodiments, the permutation encoding unit 510 may itself generate the key 504 at some point before using it to encode the binary executable 502. For example, the key 504 may be generated at initialization of the embedded device 500; or, the key 504 may be generated upon receipt of the binary executable 502 or immediately prior to encoding the binary executable 502. The permutation encoding unit 510 may receive the binary executable 502 (e.g., during the "loading" mode) and, using the key 504, encode the binary executable 502 to produce the permuted executable 506 and store the permuted executable 506 in memory 520. The key 504 may be stored in memory 520 or in a secure memory array (not shown). The binary executable 502 may also be stored within the device, such as within a secure memory array (not shown), but it is contemplated that the non-encoded binary executable 502 is no longer needed by the embedded device 500, and for security reasons it is not stored thereon in a non-encoded state.

In some embodiments, the embedded device 500 may further include a permutation decoding unit 530 that has access to the key 504 and to memory 520. The permutation decoding unit 530 may retrieve the permuted executable 506 from memory 520 and decode it, using the key 504, to produce the original standard-encoded instructions in the correct sequence. The permutation decoding unit 530 delivers the standard-encoded instructions to the decoder 540; this may be on an instruction-by-instruction basis, or the permutation decoding unit 530 may decode and send the encoded instructions in blocks, or even may decode the entire permuted executable 506 before sending to the decoder 540. The decoder 540 may be configured to decode and execute the instructions, such as by sending them to an ALU 550 of the embedded device 500, using standard processes.

In an alternative to the illustrated example, the permutation encoding and permutation decoding units may be integrated into a single permutation encoding/decoding unit. Such a combined unit may advantageously have a smaller physical footprint that separate devices, providing a measure of space-saving which is critical in embedded device design; there can also be cost savings in using a single integrated circuit instead of two. On the other hand, the device design may be more complicated and less efficient (in terms of processing speed) because there is less flexibility of placement of a combined unit. Discrete encoding and decoding units may be placed precisely where they will be needed in the respective data flow, as in the illustrated example; they can be connected in signal communication with only those components that are needed to perform the encoding or decoding task. In contrast, a combined unit may require the addition of a bus connecting the unit with all of the components needed to both encode and decode a binary file, and also may require the use of additional data elements to indicate whether the unit should be in "encoding" or "decoding" mode for a given input.

Figure 6:
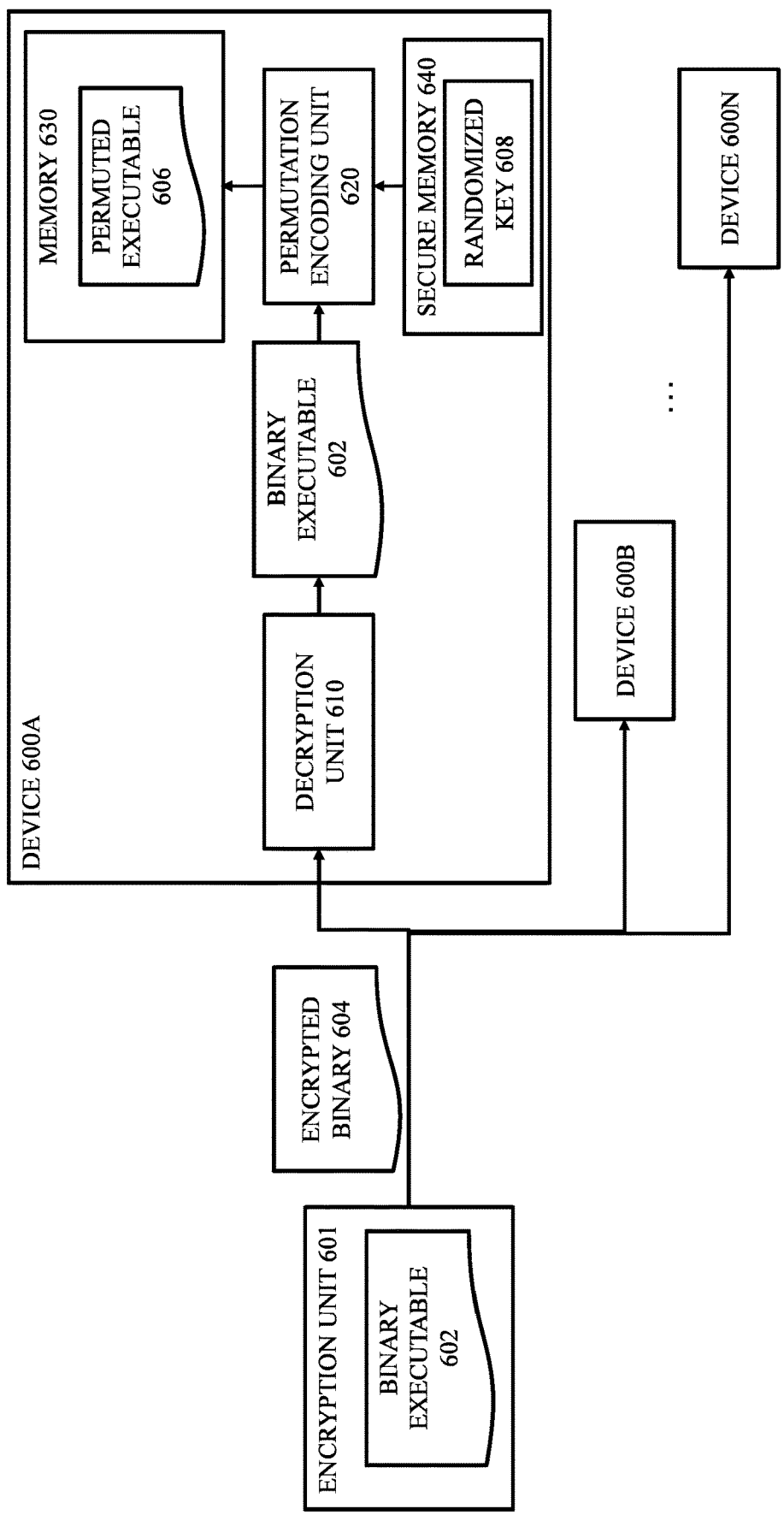
FIG. 6 is a block diagram depicting an example hardware and software encoding implementation for a plurality of embedded devices in accordance with this disclosure.

FIG. 6 illustrates an example of how a software program can be distributed to a plurality of embedded devices 600A, 600B, . . . , 600N that like the embedded device 500 of FIG. 5 are configured to encode a binary executable 602 of the software program using a secret permutation of the instruction encodings. In some embodiments, the binary executable 602 may be encrypted to protect it from lifting and other attacks during transport. An encryption unit 601 operated by a trusted source of the software program may be used to encrypt the binary executable 602 using any suitable encryption method, producing an encrypted binary 604. The encrypted binary 604 may then be distributed to any or all of the set of embedded devices 600A-N using a suitable means of communication.

Each of the embedded devices 600A may be configured as illustrated for a first example embedded device 600A. A decryption unit 610 may receive the encrypted binary 604. The decryption unit 610 may check the signature of a new encrypted binary 604 before accepting it, to check that the encrypted binary 604 comes from a trusted source. If the signature passes this authentication, the decryption unit 610 may decrypt the encrypted binary 604 to obtain the binary executable 602. The binary executable 602 may then be delivered to a permutation encoding unit 620 that operates as described above to encode the binary executable 602 using a secret permutation of the binary encodings of the instruction set, producing a permuted executable 606 comprising a recoded binary representation of the software program. The permuted executable 606 may then be stored in memory 630 of the embedded device 600A.

There may be many possible permutations of the binary encodings of instructions in the instruction set; as described above, a given value for a key 608, accessible by the permutation encoding unit 620, determines which of the possible permutations is used by the permutation encoding unit 620 to encode (and later, to decode) the permuted executable 606. To create a form of hardware binding of the software program to a specific embedded device 600A-N, a randomization mechanism may be used to select or generate a randomized key 608 that will be used by a given one of the plurality of embedded devices 600A-N. In some embodiments, the key 608 corresponding to a given embedded device, such as the first embedded device 600A, may be generated, or selected and loaded, and stored in a secure memory 640 of the embedded device in advance of the binary executable 602 being received, such as at initialization of the device 600A. Alternatively, the permutation encoding unit 620 or another component of the embedded device 600A-N may, using randomization, generate or select the key 608 at any suitable time before encoding the binary executable 602. For example, the permutation encoding unit 620 may generate the key 608 upon receiving the binary executable and may immediately use the key 608 to encode the binary executable 602 into the permuted executable 606.

The key 608 may be stored in secure memory 640 at the time of encoding, or before or even after the encoding takes place.

Each of the embedded devices 600A-N may use a different randomly chosen key 608 and thus a different secret permutation of the binary encodings of the instructions in the instruction set; consequently, only a decoding unit (e.g., the permutation encoding unit 620 or another decoding unit configured to access the key 608 in secure memory 640) of the particular device 600A-N is able to correctly decode the permuted executable 606 into the binary executable 602. Furthermore, if an attacker were to successfully determine the secret permutation used to produce the permuted executable 606 of a given one of the embedded devices 600A-N (e.g., the first embedded device 600A), that information could not be used to disassemble the permuted executable 606 of another of the embedded device 600A-N (e.g., a second embedded device 600B) that selected a different randomized key 608 for its internal encoding of the binary executable 602. In embodiments where the key 608 is internally selected or generated by the permutation encoding unit 620 or another component of the embedded device 600A-N, the key 608 may be "refreshed" (i.e., a new key 608 generated or selected) from time to time to increase the protection against an attacker.

Figure 7:
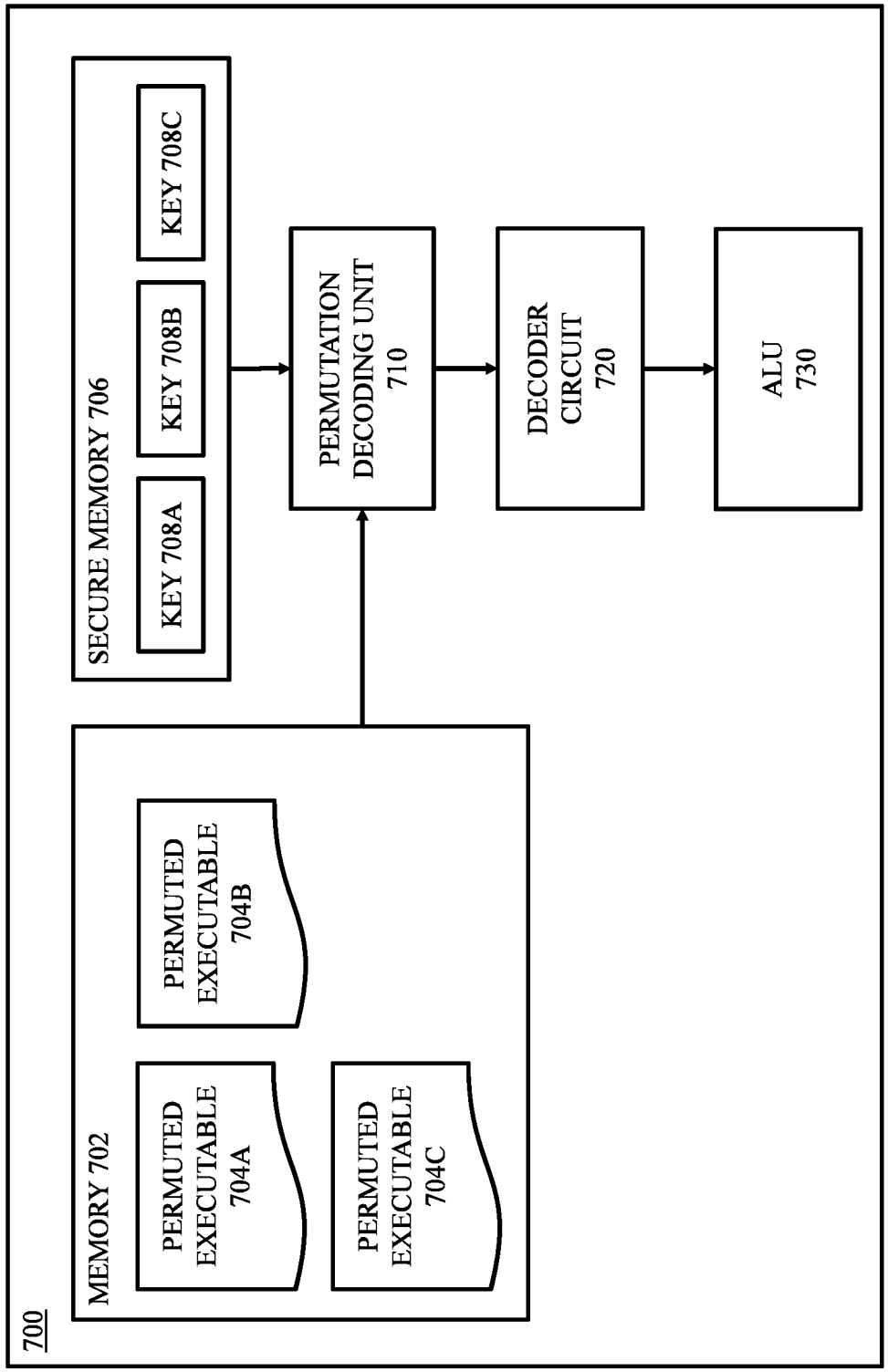
FIG. 7 is a block diagram depicting yet another example hardware implementation of an embedded device in accordance with this disclosure.

Referring to FIG. 7, as there may be many different values (i.e., keys) that each define a different secret permutation, embodiments of the present disclosure may provide compartmentalization between software programs stored on an embedded device 700. For example, the embedded device 700 may have memory 702 storing a plurality of permuted executables 704A, 704B, 704C each representing a different software program, the permuted executables 704A-C each having been encoded from a binary executable of the corresponding software program as described above. The embedded device 700 further may have secure memory 706 storing a plurality of keys 708A, 708B, 708C as described above, each being associated with a different binary executable representing one of the software programs. The embedded device 700 may include a permutation decoding unit 710 configured to decode the stored permuted executables 704A-C. For example, the permutation decoding unit 710 may obtain a first permuted executable 704A from memory 702, determine that the permuted executable 704A was encoded using a first key 708A, obtain the key 708A from the secure memory 706, and decode the permuted executable 704A back into the correct sequence of instructions in their standard binary encodings. The permutation decoding unit 710 may then deliver the binary code to a decoder 720 of the embedded device 700, which decodes and executes the instructions, such as by sending instructions to an ALU 730 of the embedded device 700, using standard processes. This compartmentalization between stored applications is achieved by using a different key 708A-C, and thus a different secret permutation of the instruction encodings, to create the corresponding permuted executable 704A-C for each application; even if an attacker somehow takes over one application, the attacker would not be able to "jump" to the stored binary of another application using the same decoding of the instructions.

The present disclosure describes various implementations of an embedded device and a system of embedded devices that include permutation encoding/decoding units, and of algorithms for protecting program code, all configured to obfuscate the correct binary encoding of the program code by rearranging the binary encodings of instructions according to various secret permutations thereof. In some aspects, the disclosure provides a system for protecting program code in an embedded device, the system including a permutation decoding unit in signal communication with a processing section of the embedded device, the processing section including a processor and a decoder circuit configured to decode, according to a set of standard binary encodings associated with an instruction set, binary code into instructions executable by the processor, the permutation decoding unit including computing hardware configured to execute control logic that causes the permutation decoding unit to, responsive to a control signal received from the processing section, identify, based on the control signal, a program to be executed by the processor and, until a program counter has reached an end of the program, repeatedly: obtain, based on the program counter, a next value to be processed from a permuted executable stored in memory of the embedded device, the permuted executable comprising a binary representation of the program encoded using a first permutation of the standard binary encoding, the first permutation based on a key accessible by the permutation decoding unit; determine that the next value includes one of a set of permuted binary encodings; use the key to decode the determined permuted binary encoding into a corresponding one of the set of standard binary encodings; replace the determined permuted binary encoding with the corresponding standard binary encoding within the next value to produce a standard encoded instruction; and, transmit the standard encoded instruction to the decoder circuit, the decoder circuit responsively using the set of standard binary encodings to decode the standard encoded instruction into a corresponding instruction, causing the corresponding instruction to be executed by the processor, and causing the program counter to be updated.

The permutation decoding unit may be disposed adjacent to the decoder circuit, within a signal path between an instruction cache of the processor and the decoder circuit, such that all the binary code associated with the program stored in the memory or in the instruction cache is encoded using the set of permuted binary encodings and not using the set of standard binary encodings. The key may have a first secret value of a plurality of secret values each identifying a corresponding one of a plurality of possible permutations of the set of standard binary encodings; each of the set of permuted binary encodings may match a corresponding one of the set of standard binary encodings, and a plurality of the set of permuted binary encodings may not correspond to the instructions represented by the corresponding standard binary encodings that match.

The permuted executable may be produced externally to the embedded device and the key and the permuted executable are subsequently loaded into the embedded device; source code of the program may be compiled using the set of standard encodings to produce a binary executable, and the binary executable may be recoded by replacing appearances in the binary code of each of the standard binary encodings with the corresponding permuted binary encoding determined by the key to produce the permuted executable. Alternatively, source code of the program may be compiled using the set of permuted binary encodings to produce the permuted executable.

The system may further include a permutation encoding unit disposed on the embedded device and including computing hardware configured to execute control logic that causes the permutation encoding unit to: receive a binary executable loaded into the embedded device, the binary executable being compiled from source code of the program using the set of standard binary encodings for the instruction set; using the key, determine the set of permuted binary encodings that represent the first permutation of the set of standard binary encodings; recode the binary executable by procedurally replacing appearances in the binary executable of each of the standard binary encodings with the corresponding permuted binary encoding to produce the permuted executable; and, cause the permuted executable to be stored in the memory. The permutation encoding unit and the permutation decoding unit may be combined in a single hardware module disposed in the embedded device. The computing hardware of the permutation encoding unit may be configured to execute control logic that causes the permutation encoding unit to generate the key, such that a value of the key is unknown externally to the embedded device. The system may further include an encryption unit external to the embedded device and serving as a trusted source of the program code for the embedded device, the encryption unit configured to encrypt the binary executable to produce an encrypted binary, and a decryption unit disposed in the embedded device and configured to: receive the encrypted binary; authenticate the trusted source of the encrypted binary; responsive to authenticating the trusted source, decrypt the encrypted binary into the binary executable; and, cause the binary executable to be provided to the permutation encoding unit.

The permuted executable may be a first permuted executable of a plurality of permuted executables stored in memory of the embedded device, each of the plurality of permuted executables representing a different software program executable by the processor. The key may be a first key of a plurality of keys stored in a secured memory module of the embedded device, each of the plurality of keys being associated with a corresponding one of the plurality of permuted executables including the first key being associated with the first permuted executable. Based on the control logic executed by the computing hardware of the permutation decoding unit, the permutation decoding unit may use the control signal to determine which of the plurality of permuted executables is associated with the program to be executed by the processor, and decode the determined permuted executable using the corresponding key to produce a corresponding binary executable that uses the set of standard binary encodings for the instruction set.

In another aspect, the present disclosure provides a system for diversifying instruction encodings in embedded devices that operate using a set of standard binary encodings of each instruction in an instruction set. The system may include first circuitry implementing a permutation encoding unit configured to receive, as input, a binary executable encoded using the set of standard binary encodings for the instruction set, the binary executable representing a program, and recode the binary executable one or more times to produce, as output, corresponding one or more permuted executables representing the program. To perform each recoding, the first circuitry: obtains one of a plurality of keys each having a corresponding value that identifies one of a plurality of possible permutations of the standard binary encodings in the set; determines a set of permuted binary encodings that represents the identified permutation of the set of standard binary encodings; and procedurally replaces appearances in the binary executable of each of the standard binary encodings with the corresponding permuted binary encoding to produce a corresponding permuted executable associated with the key. The system may further include transport circuitry configured to receive the output of the first circuitry and cause the output to be stored in memory of one or more of the embedded devices such that each embedded device having one of the plurality of keys receives the corresponding permuted executable associated with that key. The system may further include second circuitry in each of the embedded devices that implements a permutation decoding unit having access to the key and the memory of the corresponding embedded device and configured to receive a control signal initiating execution of the program by a processor of the corresponding embedded device and, until a program counter has reached an end of the program, repeatedly: obtain, based on the program counter, a next value to be processed from the permuted executable stored in memory of the corresponding embedded device; use the key to identify the permuted binary encoding present in the next value and decode it into the corresponding standard binary encoding; replace the determined permuted binary encoding with the corresponding standard binary encoding within the next value to produce, as output, a standard encoded instruction; and, transmit the standard encoded instruction to a decoder circuit of the corresponding embedded device, the decoder circuit responsively using the set of standard binary encodings to decode the standard encoded instruction into a corresponding instruction, causing the corresponding instruction to be executed by the processor, and causing the program counter to be updated.

The first circuitry may be disposed within an encoding unit external to the embedded devices and may perform the binary executable recodings for all of the embedded devices; the transport circuitry may load into each of the embedded devices a corresponding key and the corresponding permuted executable associated with the corresponding key. The second circuitry of each embedded device may be disposed adjacent to the decoder circuit of the embedded device, within a signal path between an instruction cache of the processor and the decoder circuit, such that all of the binary code associated with the program stored in the memory or in the instruction cache is encoded using the set of permuted binary encodings and not using the set of standard binary encodings. The first circuitry and the transport circuitry may be disposed in each of the embedded devices, the first circuitry of each embedded device performing only the binary executable recoding associated with the corresponding embedded device. The first circuitry of each embedded device may be further configured to generate the key used to encode the corresponding permuted executable stored in memory of the embedded device, such that the value of the key is unknown externally to the corresponding embedded device.

In another aspect, the present disclosure provides a method for protecting execution of a program on an embedded device that operates using a set of standard binary encodings of each instruction in an instruction set, the method including the steps of: accessing, by a permutation decoding unit of the embedded device, a permuted executable stored in memory of the embedded device, the permuted executable comprising a binary representation of the program encoded using a first permutation of the standard binary encodings, the first permutation based on a key associated with the embedded device; and, obtaining, by the permutation decoding unit, the key and a program counter associated with execution of the program. The method further includes, repeatedly, until the program counter has reached an end of the program: obtaining, based on the program counter, a next value to be processed from the permuted executable; identifying in the next value one of a set of permuted binary encodings; using the key to decode the determined permuted binary encoding into a corresponding one of the set of standard binary encodings; replacing the determined permuted binary encoding with the corresponding standard binary encoding within the next value to produce a standard encoded instruction; and, transmitting the standard encoded instruction to a decoder circuit of the embedded device, the decoder circuit responsively using the set of standard binary encodings to decode the standard encoded instruction into a corresponding instruction, causing the corresponding instruction to be executed by the processor, and causing the program counter to be updated.

The method may further include the steps of: receiving, by a permutation encoding unit of the embedded device, a binary executable compiled from source code of the program using the set of standard binary encodings for the instruction set; using the key, determining, by the permutation encoding unit, the set of permuted binary encodings that represent the first permutation of the set of standard binary encodings; procedurally replacing, by the encoding unit, appearances in the binary executable of each of the standard binary encodings with the corresponding permuted binary encoding to produce the permuted executable; and, causing the permuted executable to be stored in the memory of the embedded device. The method may further include, before using the key, generating, by the permutation encoding unit, the key and storing the key in secure memory of the embedded device.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. Similarly, the description may refer to a left-hand or right-hand bit in any series of bits (e.g., a DAC code or LDO code). It should be understood that such terms are utilized to provide a clear description of an implementation of the invention and that the various bit sequencing may be implemented in any order in memory and, in fact, the multiple bits making up a given code or other word could be implemented in different regions of a memory or across multiple different memory devices. Similar, the present description may describe a stored binary value being set when having a signal value greater than a threshold and cleared when the cell's signal value is less than that threshold. It will be apparent to the person of ordinary skill in the art that such definitions may be reversed so that a particular cell may be set when its signal value falls below a threshold and the cell is cleared when its value falls above the same or a different threshold.

The term "coupled" is defined as connected, although not necessarily directly, and not necessarily mechanically. The terms "a" and "an" are defined as one or more unless stated otherwise. The terms "comprise" and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A system for protecting program code in an embedded device, the system comprising a permutation decoding unit in signal communication with a processing section of the embedded device, the processing section comprising a processor and a decoder circuit configured to decode, according to a set of standard binary encodings associated with an instruction set, binary code into instructions executable by the processor, the permutation decoding unit comprising computing hardware configured to execute control logic that causes the permutation decoding unit to, responsive to a control signal received from the processing section:
   identify, based on the control signal, a program to be executed by the processor; and
   until a program counter has reached an end of the program, repeatedly:
      obtain, based on the program counter, a next value to be processed from a permuted executable stored in memory of the embedded device, the permuted executable comprising a binary representation of the program encoded using a first permutation of the standard binary encoding, the first permutation based on a key accessible by the permutation decoding unit;
      determine that the next value includes one of a set of permuted binary encodings;
      use the key to decode the determined permuted binary encoding into a corresponding one of the set of standard binary encodings;
      replace the determined permuted binary encoding with the corresponding standard binary encoding within the next value to produce a standard encoded instruction; and
      transmit the standard encoded instruction to the decoder circuit, the decoder circuit responsively:
         using the set of standard binary encodings to decode the standard encoded instruction into a corresponding instruction;
         causing the corresponding instruction to be executed by the processor; and
         causing the program counter to be updated.

2. The system of claim 1, wherein the permutation decoding unit is disposed adjacent to the decoder circuit, within a signal path between an instruction cache of the processor and the decoder circuit, such that all of the binary code associated with the program stored in the memory or in the instruction cache is encoded using the set of permuted binary encodings and not using the set of standard binary encodings.

3. The system of claim 1, wherein:
   the key comprises a first secret value of a plurality of secret values each identifying a corresponding one of a plurality of possible permutations of the set of standard binary encodings;
   each of the set of permuted binary encodings matches a corresponding one of the set of standard binary encodings; and a plurality of the set of permuted binary encodings do not correspond to the instructions represented by the corresponding standard binary encodings that match.

4. The system of claim 1, wherein the permuted executable is produced externally to the embedded device and the key and the permuted executable are subsequently loaded into the embedded device.

5. The system of claim 4, wherein source code of the program is compiled using the set of standard encodings to produce a binary executable, and the binary executable is recoded by replacing appearances in the binary code of each of the standard binary encodings with the corresponding permuted binary encoding determined by the key to produce the permuted executable.

6. The system of claim 4, wherein source code of the program is compiled using the set of permuted binary encodings to produce the permuted executable.

7. The system of claim 1, further comprising a permutation encoding unit disposed on the embedded device and comprising computing hardware configured to execute control logic that causes the permutation encoding unit to:
   receive a binary executable loaded into the embedded device, the binary executable being compiled from source code of the program using the set of standard binary encodings for the instruction set;
   using the key, determine the set of permuted binary encodings that represent the first permutation of the set of standard binary encodings;
   recode the binary executable by procedurally replacing appearances in the binary executable of each of the standard binary encodings with the corresponding permuted binary encoding to produce the permuted executable; and
   cause the permuted executable to be stored in the memory.

8. The system of claim 7, wherein the permutation encoding unit and the permutation decoding unit are combined in a single hardware module disposed in the embedded device.

9. The system of claim 7, wherein the computing hardware of the permutation encoding unit is further configured to execute control logic that causes the permutation encoding unit to generate the key, such that a value of the key is unknown externally to the embedded device.

10. The system of claim 9, further comprising:
    an encryption unit external to the embedded device and serving as a trusted source of the program code for the embedded device, the encryption unit configured to encrypt the binary executable to produce an encrypted binary; and
    a decryption unit disposed in the embedded device and configured to:
        receive the encrypted binary;
        authenticate the trusted source of the encrypted binary;
        responsive to authenticating the trusted source, decrypt the encrypted binary into the binary executable; and
        cause the binary executable to be provided to the permutation encoding unit.

11. The system of claim 1, wherein:
    the permuted executable is a first permuted executable of a plurality of permuted executables stored in memory of the embedded device, each of the plurality of permuted executables representing a different software program executable by the processor;
    the key is a first key of a plurality of keys stored in a secured memory module of the embedded device, each of the plurality of keys being associated with a corresponding one of the plurality of permuted executables including the first key being associated with the first permuted executable; and
    based on the control logic executed by the computing hardware of the permutation decoding unit, the permutation decoding unit is configured to:
        use the control signal to determine which of the plurality of permuted executables is associated with the program to be executed by the processor; and
        decode the determined permuted executable using the corresponding key to produce a corresponding binary executable that uses the set of standard binary encodings for the instruction set.

12. A system for diversifying instruction encodings in embedded devices that operate using a set of standard binary encodings of each instruction in an instruction set, the system comprising:
    first circuitry implementing a permutation encoding unit configured to:
        receive as input a binary executable encoded using the set of standard binary encodings for the instruction set, the binary executable representing a program; and
        recode the binary executable one or more times to produce, as output, corresponding one or more permuted executables representing the program, wherein to perform each recoding the first circuitry:
            obtains one of a plurality of keys each having a corresponding value that identifies one of a plurality of possible permutations of the standard binary encodings in the set;
            determines a set of permuted binary encodings that represents the identified permutation of the set of standard binary encodings; and
            procedurally replaces appearances in the binary executable of each of the standard binary encodings with the corresponding permuted binary encoding to produce a corresponding permuted executable associated with the key;
    transport circuitry configured to receive the output of the first circuitry and cause the output to be stored in memory of one or more of the embedded devices such that each embedded device having one of the plurality of keys receives the corresponding permuted executable associated with that key; and
    second circuitry in each of the embedded devices that implements a permutation decoding unit having access to the key and the memory of the corresponding embedded device and configured to:
        receive a control signal initiating execution of the program by a processor of the corresponding embedded device; and
        until a program counter has reached an end of the program, repeatedly:
            obtain, based on the program counter, a next value to be processed from the permuted executable stored in memory of the corresponding embedded device;
            use the key to identify the permuted binary encoding present in the next value and decode it into the corresponding standard binary encoding;
            replace the determined permuted binary encoding with the corresponding standard binary encoding within the next value to produce, as output, a standard encoded instruction; and
            transmit the standard encoded instruction to a decoder circuit of the corresponding embedded device, the decoder circuit responsively:

using the set of standard binary encodings to decode the standard encoded instruction into a corresponding instruction;

causing the corresponding instruction to be executed by the processor; and causing the program counter to be updated.

13. The system of claim 12, wherein the first circuitry is disposed within an encoding unit external to the embedded devices and performs the binary executable recodings for all of the embedded devices, and wherein the transport circuitry loads into each of the embedded devices a corresponding key and the corresponding permuted executable associated with the corresponding key.

14. The system of claim 12, wherein the second circuitry of each embedded device is disposed adjacent to the decoder circuit of the embedded device, within a signal path between an instruction cache of the processor and the decoder circuit, such that all of the binary code associated with the program stored in the memory or in the instruction cache is encoded using the set of permuted binary encodings and not using the set of standard binary encodings.

15. The system of claim 12, wherein the first circuitry and the transport circuitry are disposed in each of the embedded devices, the first circuitry of each embedded device performing only the binary executable recoding associated with the corresponding embedded device.

16. The system of claim 15, wherein the first circuitry of each embedded device is further configured to generate the key used to encode the corresponding permuted executable stored in memory of the embedded device, such that the value of the key is unknown externally to the corresponding embedded device.

17. A method for protecting execution of a program on an embedded device that operates using a set of standard binary encodings of each instruction in an instruction set, the method comprising:

accessing, by a permutation decoding unit of the embedded device, a permuted executable stored in memory of the embedded device, the permuted executable comprising a binary representation of the program encoded using a first permutation of the standard binary encodings, the first permutation based on a key associated with the embedded device;

obtaining, by the permutation decoding unit, the key and a program counter associated with execution of the program; and until the program counter has reached an end of the program, repeatedly:

obtaining, based on the program counter, a next value to be processed from the permuted executable;

identifying in the next value one of a set of permuted binary encodings;

using the key to decode the determined permuted binary encoding into a corresponding one of the set of standard binary encodings;

replacing the determined permuted binary encoding with the corresponding standard binary encoding within the next value to produce a standard encoded instruction; and transmitting the standard encoded instruction to a decoder circuit of the embedded device, the decoder circuit responsively:

using the set of standard binary encodings to decode the standard encoded instruction into a corresponding instruction;

causing the corresponding instruction to be executed by the processor; and causing the program counter to be updated.

18. The method of claim 17, further comprising:

receiving, by a permutation encoding unit of the embedded device, a binary executable compiled from source code of the program using the set of standard binary encodings for the instruction set;

using the key, determining, by the permutation encoding unit, the set of permuted binary encodings that represent the first permutation of the set of standard binary encodings;

procedurally replacing, by the encoding unit, appearances in the binary executable of each of the standard binary encodings with the corresponding permuted binary encoding to produce the permuted executable; and causing the permuted executable to be stored in the memory of the embedded device.

19. The method of claim 18, further comprising, before using the key, generating, by the permutation encoding unit, the key and storing the key in secure memory of the embedded device.

* * * * *